US011250733B2

(12) United States Patent
Vimercati

(10) Patent No.: US 11,250,733 B2
(45) Date of Patent: Feb. 15, 2022

(54) LABEL AND MANUFACTURING METHOD

(71) Applicant: PILOT ITALIA S.P.A., Milan (IT)

(72) Inventor: Giancarlo Vimercati, Milan (IT)

(73) Assignee: PILOT ITALIA S.P.A., Milan (IT)

( * ) Notice: Subject to any disclaimer, the term of this patent is extended or adjusted under 35 U.S.C. 154(b) by 0 days.

(21) Appl. No.: 16/765,190

(22) PCT Filed: Oct. 25, 2018

(86) PCT No.: PCT/IB2018/058321
§ 371 (c)(1),
(2) Date: May 19, 2020

(87) PCT Pub. No.: WO2019/097330
PCT Pub. Date: May 23, 2019

(65) Prior Publication Data
US 2020/0279512 A1    Sep. 3, 2020

(30) Foreign Application Priority Data

Nov. 20, 2017 (IT) .......................... 102017000132331

(51) Int. Cl.
| | |
|---|---|
| *G09F 3/10* | (2006.01) |
| *B32B 7/12* | (2006.01) |
| *G09F 3/02* | (2006.01) |
| *B05D 1/00* | (2006.01) |

(52) U.S. Cl.
CPC .................. *G09F 3/10* (2013.01); *B32B 7/12* (2013.01); *G09F 3/02* (2013.01); *B05D 1/00* (2013.01);
(Continued)

(58) Field of Classification Search
CPC ..... A23L 33/135; A61K 35/74; A61K 35/741; A61K 38/164; A61P 17/02; A61P 31/02;
(Continued)

(56) References Cited

U.S. PATENT DOCUMENTS 5,135,125 A * 8/1992 Andel ................. A61M 5/1417
215/12.1
5,878,901 A * 3/1999 Grosskopf ........... B65D 23/005
215/399
(Continued)

FOREIGN PATENT DOCUMENTS

| CN | 201685500 U | 12/2010 |
|---|---|---|
| EP | 0356574 A2 | 3/1990 |
| EP | 2246266 A1 | 11/2010 |

OTHER PUBLICATIONS

English translation of EP0356574.*
(Continued)

*Primary Examiner* — Sonya M Sengupta
(74) *Attorney, Agent, or Firm* — Armstrong Teasdale LLP

(57) ABSTRACT

A method for manufacturing a label with a suspension handle includes i) providing a first layered material including a support layer and a first front layer joined in a releasable manner; ii) covering a front surface of the first front layer with a detachment promoter layer, leaving a free zone where the promoter layer is absent; iii) providing a second layered material including a second front layer transparent to light and an adhesive layer iv) joining the products of steps ii) and iii) in a coupled material and v) separating a suspension handle in the handle area, at least one secondary label of the label in a different area, and forming a label surround in the first front layer. At the secondary label, the label includes an opaque contrast layer superposed on the second front layer eliminate transparency, a second graphic layer superposed on the contrast layer, and a protective layer.

14 Claims, 9 Drawing Sheets

(52) U.S. Cl.
CPC ..... *B32B 2307/412* (2013.01); *B32B 2519/00* (2013.01); *G09F 2003/027* (2013.01); *G09F 2003/0247* (2013.01); *G09F 2003/0273* (2013.01)

(58) Field of Classification Search
CPC .............. A61P 31/04; G01N 2333/195; G01N 33/554; G01N 33/56911; G01N 33/92; Y02A 50/30; B32B 2307/412; B32B 2519/00; B32B 7/12; G09F 2003/0247; G09F 2003/027; G09F 2003/0273; G09F 3/02; G09F 3/10
See application file for complete search history.

(56) References Cited

U.S. PATENT DOCUMENTS

| | | | | |
|---|---|---|---|---|
| 6,102,441 | A | * | 8/2000 | Treleaven ............ B65D 23/003 215/399 |
| 6,125,563 | A | * | 10/2000 | Girerd .................. B65D 23/106 315/396 |
| 2006/0057313 | A1 | * | 3/2006 | Moosheimer ......... G09F 3/0288 428/34.1 |
| 2020/0279512 | A1 | * | 9/2020 | Vimercati ................. B32B 7/12 |
| 2020/0312198 | A1 | * | 10/2020 | Vimercati .............. B32B 37/02 |

OTHER PUBLICATIONS

English translation of CN2016805500.*
Patent Family of WO2019/097330.*
International Search Report and Written Opinion for International Patent Application No. PCT/IB2018/058321, dated Jan. 2, 2019. 10 pages.
International Preliminary Report on Patentability for International Patent Application No. PCT/IB2018/058321, dated Aug. 16, 2019. 12 pages.

* cited by examiner

LABEL AND MANUFACTURING METHOD

CROSS-REFERENCE TO RELATED APPLICATIONS

This application is a National Phase filing of PCT International Application No. PCT/IB2018/058321, having an International Filing Date of Oct. 25, 2018, claiming the benefit of priority to Italian Patent Application No. 102017000132331, having a filing date of Nov. 20, 2017, each of which is hereby incorporated by reference in its entirety.

FIELD OF THE INVENTION

The present invention relates to a method for manufacturing a label with a to handle for suspending a bottle in an overturned position, and to a label with a handle obtainable by said method.

Prior art document EP0356574A2 describes a label with a handle applicable to a bottle wherein, when in the non-use position, the handle protrudes free from an upper edge of the label.

Besides the disadvantage of having a protruding handle that interferes with the closure area of small-volume bottles, this approach suffers from the drawback of being a technically complex and costly solution.

Prior art document EP2246266A1, in the name of the instant applicant, describes a label provided with a handle made by joining two distinct adhesive films.

As described in the above-cited document, a bottom film comprises the indications required to identify the infusion container, while a top transparent film is adherently joined to the bottom film and forms the handle to overturn the container when administering the contents thereof to a patient.

A drawback of the above prior art consists in the fact that, when the label is applied to a bottle, any printed characters on the surface tend to be damaged by the mechanical stresses the bottle and the label are subjected to in the labeling machine.

SUMMARY OF THE INVENTION

The present invention provides a method and a self-adhesive label to overcome the drawbacks of the prior art.

In particular, the method and the label described herein have been designed to make the printed characters of the secondary label resistant to abrasion. In addition, according to an advantageous aspect of the present invention, the secondary label has been designed to be writable on the surface using ordinary writing instruments.

Such object is achieved by the method and the label having the features described below. Preferred embodiments are also described.

BRIEF DESCRIPTION OF THE DRAWINGS

The object of the present invention will now be described in detail, with reference to the accompanying drawings, wherein:

FIG. 16 shows a label according to the present invention, according to a possible embodiment, in which the grip portion of the handle and a secondary label portion are partially raised.

DETAILED DESCRIPTION

Figure 1:
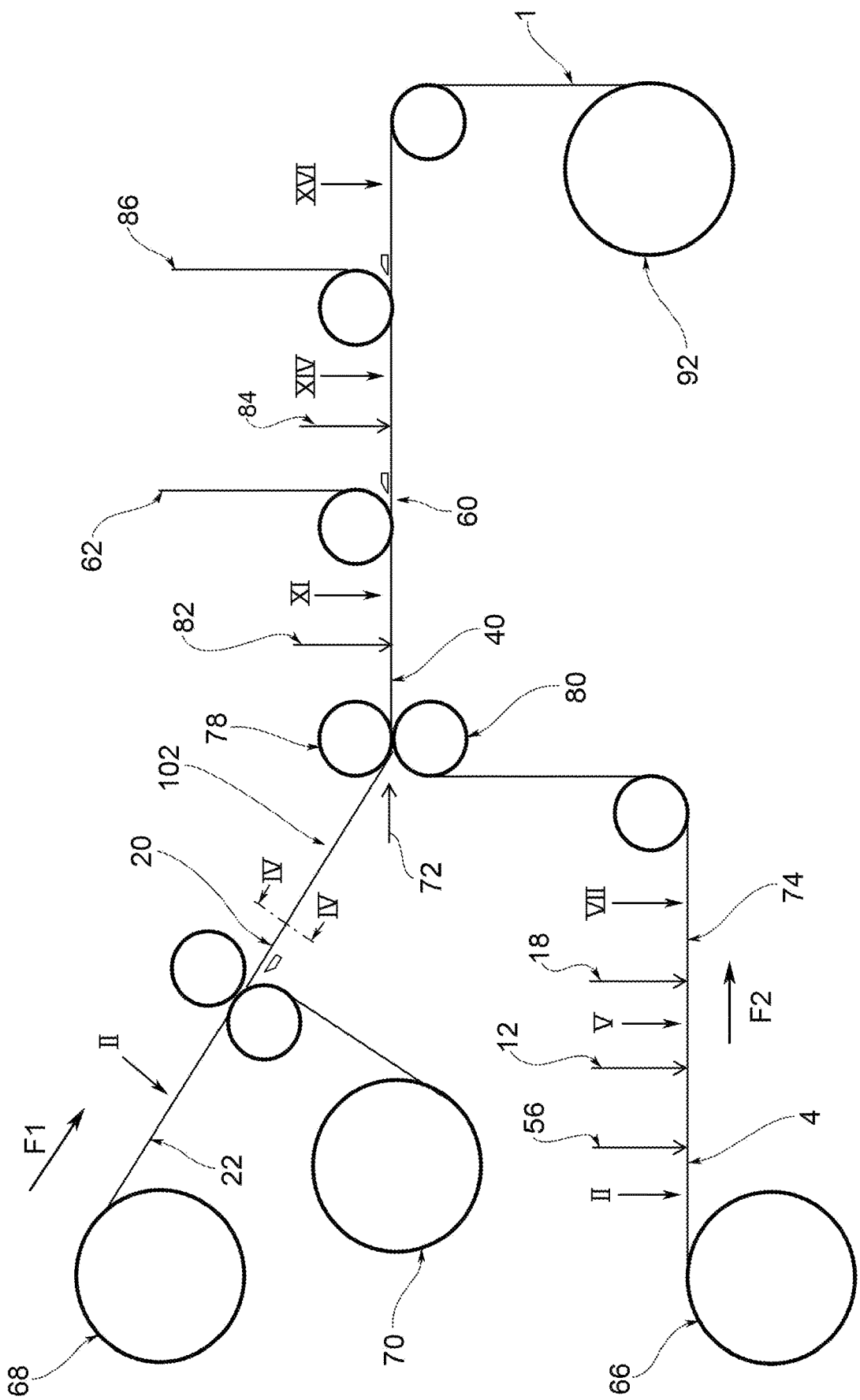
FIG. 1 shows a schematic diagram of a manufacturing method, object of the present invention, according to a possible embodiment.
Figure 2:
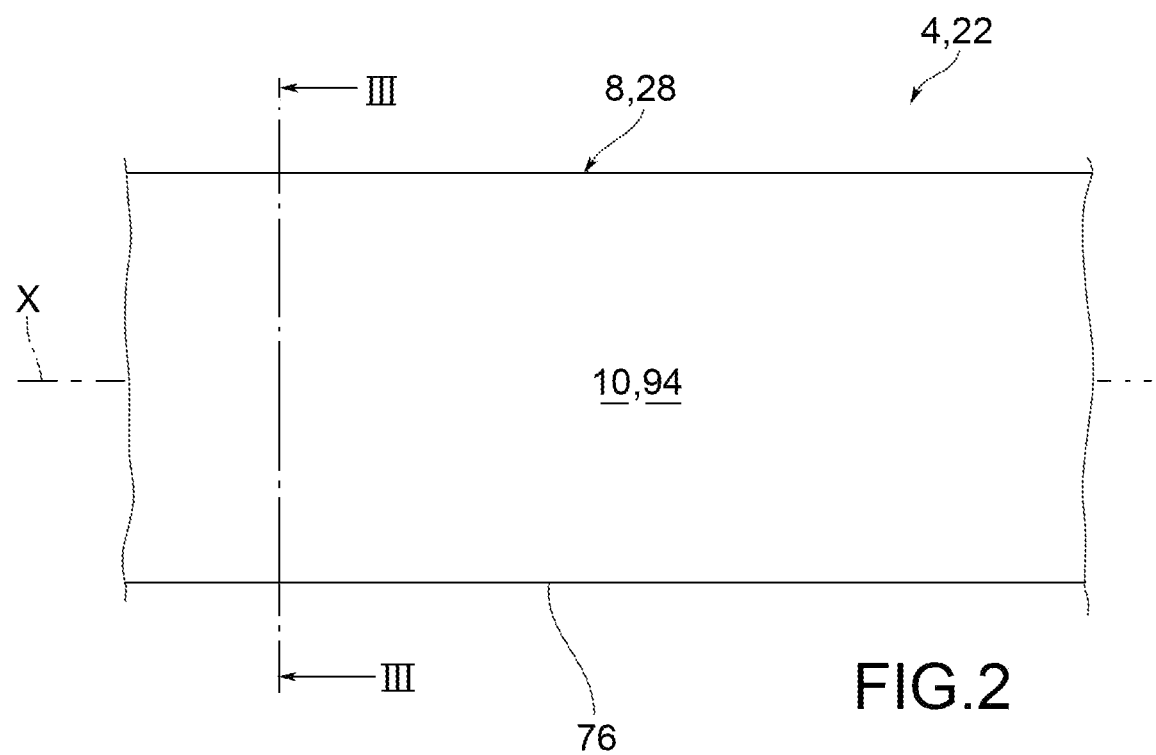
FIGS. 2, 5, 7, 11, 14, 16 show views of the multilayer material at the positions indicated by the numbers II, V, VII, XI, XIV, XVI in FIG. 1, in the direction of the arrow shown each time.
Figure 3:
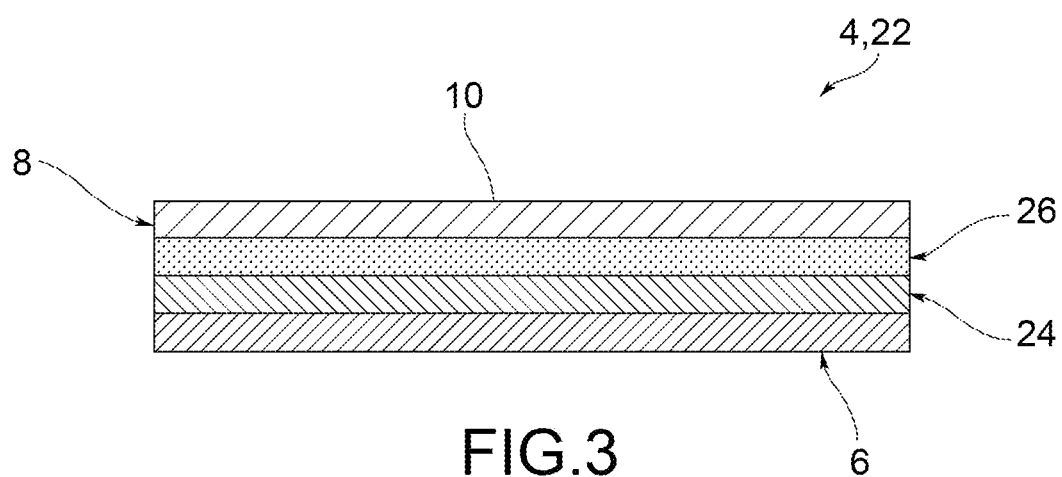
FIGS. 3 and 4 illustrate respectively a cross-section through the plane indicated in FIG. 2 and through the plane IV-IV shown in FIG. 1.
Figure 4:
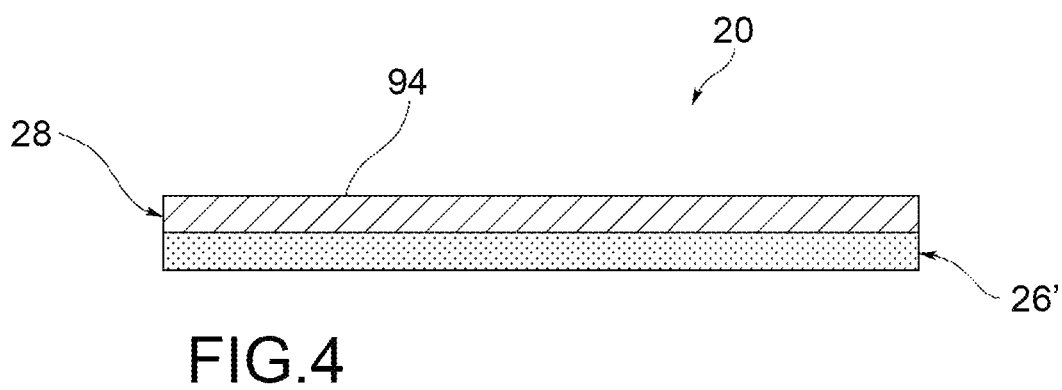

The above objects are achieved by a method for manufacturing a label 1 with a suspension handle 2 comprising steps of:

i) providing a first layered material 4 which comprises a support layer 6 and a first front layer 8 joined in a releasable manner;

ii) coating a front surface 10 of the first front layer 8 with at least one detachment promoter layer 12, 18 (e.g. a silicone paint), leaving a free zone 14 wherein such promoter layer 12, 18 is absent;

iii) optionally coating in register a handle area 16 of a first detachment promoter layer 12 with a second detachment promoter layer 18 in a liquid or semi-liquid form;

iv) providing a second layered material 20 comprising a second transparent front layer 28 and an adhesive layer 26';

v) joining the products of steps ii) and iv), or steps iii) and iv), in a coupled material 40, so that the adhesive layer 26' adheres at least to the free zone 14 of the first layered material 4 (in particular for forming an anchoring foot 46);

vi) optionally solidifying or curing the second detachment promoter layer 18 in contact with the adhesive layer 26' of the second layered material 20, in order to bind such layers 18, 26'; and vii) at least in the thickness Si of the second front layer 28 separating ('cutting out', according to an embodiment) a suspension handle 2 from the handle area 16, at least one secondary label 34 of said label 1 in a different area 36 (different from the position of the suspension handle 2) and forming a label surround 38 in the first front layer 8.

For example, the secondary labels 34 may be a plurality.

According to one embodiment, the different area 36 may be superposed only on the first layer detachment promoter 12 (when two promoter layers are envisaged).

According to one embodiment, the suspension handle 2 is contained within a label width 100. In other words, the handle does not protrude outside the second front layer 28.

In one embodiment, the first layered material 4 and/or the second layered material 20 are shaped as a tape extending along a predominant extension direction X, X'.

According to a further embodiment, the first front layer 8 and/or the second 28 front layer may comprise or consist of a plastic film.

According to an even further embodiment, the first front layer 8 and/or the second 28 front layer may have an average density of about 50-500 g/m2, optionally 70-300 g/m2, for example about 150 g/m2.

In an embodiment, the front surface 10 of the first front layer 8 and/or a front surface 94 of the second front layer 28 are substantially planar and optionally printable. In particular, one of or both these surfaces are configured so that graphic layers 56, 58 may be distributed and adhered thereon.

At least one part of the front surface 10 of the first front layer 8 will remain visible on a bottle, when the label 1 is applied to the latter, specifically by virtue of the transparency of the second front layer 28.

Advantageously, the support layer 6 acts as a releasable support for the finished label 1, and not just for the first front layer 8.

According to an embodiment, the second front layer 28 is only partially opaque to the suspension handle 2 to reveal the presence thereof, advantageously without concealing the first graphic layer 56 superposed on the first front layer 8.

In other words, partial opacification of the second front layer 28, on the one hand, allows for the first graphic layer 56 to be seen, (due to partial transparency of the layer 28), and, on the other, allows to determine the suspension handle that partially superposes the first graphic layer 56 (due to the opaque component, partially impervious to light, of the layer 28).

According to an embodiment, at the secondary label 34, the label 1 comprises an opaque contrast layer 104 (for example, see FIG. 13 or FIG. 15), superposed on the second front layer 28 to eliminate the transparency thereof, at least one second graphic layer 58 superposed on the contrast layer 104 and at least one protective layer 106 of the at least one second graphic layer 58, at least partially transparent to light.

The contrast layer 104 is a layer configured to make the transparency of the second front layer 28 opaque, and further to serve as a background and to create contrast with the at least one second graphic layer 58.

The at least one protective layer 106, on the other hand, is superposed on the at least one second graphic layer 58 (and preferably also on the contrast layer 104) so that the abrasive phenomena that occur when applying the label on a bottle do not remove or scratch off the at least one second graphic layer 58, or the contrast layer 104 and the at least one second graphic layer 58 (according to the embodiments).

For example, for a dark or black graphic layer 58, the contrast layer 104 may be a soft and/or neutral color, for example white.

According to one embodiment, the at least one protective layer 106 is applied at least on the at least one second graphic layer 58 using a flexographic method.

According to an embodiment, the at least one protective layer 106 is applied at least on the at least one second graphic layer 58 by a method other than a flexographic method.

According to an embodiment, the at least one protective layer 106 is applied with a thickness equal to or greater than at least 1 μm.

According to an embodiment, the at least one protective layer 106 delimits a surface 108 writeable by an ink-writing tool, such as a ballpoint pen (jotter), or by line markers such as thermal transfer markers.

In other words, the at least one protective layer 106 serves the dual function of protection (as discussed above) and of writable substrate for annotating custom information on the secondary label 34.

According to an embodiment, the second front layer 28 is made opaque through a pigment or a color mixed with a detachment promoter substance of the detachment promoter layer 12, 18.

According to a particularly advantageous embodiment, the first layered material 4 and a precursor 22 of the second layered material 20 comprise corresponding or substantially identical layers. A definition of "identical" is provided in the following description.

In one embodiment, such layers comprise, superposed on each other, a support layer 6, a de-adhesive layer 24 (e.g. silicone-based), an adhesive layer 26, 26' and a first front layer 8 and/or a second 28 front layer. According to such embodiment, step iv) comprises a step of separating, and optionally discarding, the support layer and the de-adhesive layer of the precursor 22 upstream of step v).

During optional step vi), the second detachment promoter layer 18 is then solidified (e.g. dried) in contact with the adhesive layer 26' so as to bind such layers, so that the adhesive layer cannot perform its adhesive function, as it is at least partially covered (and therefore rendered inert) by the second solid detachment promoter layer 18.

In other words, according to such embodiment, the second detachment promoter layer 18 works "by transfer" because, although it covers the first detachment promoter layer 12, such second layer 18 is transferred to the adhesive layer 26' so as to make it inert in step vi).

In a further embodiment, the solidification step comprises a solidification or curing step through electromagnetic radiation, e.g. by using UV or heat.

For example, step vi) may take place upstream of step vii).

According to an embodiment, the suspension handle 2 comprises at least one grip portion 30 where—in step iii)—the handle area 16 also extends at such portion 30.

In the embodiments shown, the grip portion 30 comprises a protruding portion with respect to an outer edge 32, optionally arched, of said handle 2. For example, such a protruding portion is not in adhesive contact with the underlying first front layer 8, by virtue of the double detachment promoter layer.

According to a further embodiment, step vii) comprises at least one sub-step of making at least one creasing line 42, 44 on the second front layer 28 in order to deform said second layer 28 and facilitate a lifting of a portion, for example a peripheral portion, of the secondary label 34 and/or of the suspension handle 2. Advantageously, the creasing line 44 is made at the grip portion 30 to raise a peripheral portion thereof.

In an embodiment, step vii) comprises at least a first die cutting-creasing step 82, and optionally a second die-cutting step 84, described hereinafter.

According to an embodiment, step vii) is conducted outside the free zone 14, so that in said free zone 14 the second front layer 28 comprises a single anchoring foot 46 of the suspension handle 2, from which a pair of arms 48, 48' extend, connected in the form of a ring to each other.

According to a further embodiment, during step ii) and/or step iii), the first front layer 8 and/or the first (or only) detachment promoter layer 12 are partially covered with one or more protection masks (not shown) that prevent coating of some areas 52, 50 with the first detachment promoter layer 12 and/or the second detachment promoter layer 18, in order to modulate the separation force of one edge 32 (such as the outer edge) of the suspension handle 2 and/or of a lifting portion 54 of the secondary label 34.

By way of example, at least one protection mask may comprise dot-shaped protective elements, spaced along the extension of the edge 32 and/or of the lifting portion 54 with predetermined density.

Said density will depend on the size of the suspension handle 2 and of the label 34, and on the nature of the adhesive layer 26'.

As discussed above, according to an advantageous embodiment, the second front layer 28 is at least partially light-transparent to reveal an optional graphic layer 56 distributed on the first front layer 8 (in particular: upstream of step ii) as illustrated for example in FIG. 1). In a further embodiment, a detachment promoter layer (e.g. the second promoter layer 18) comprises at least one pigment or color to make at least one part of the suspension handle 2 evident (i.e. to reveal the presence thereof).

Specifically, the pigment or color may be mixed with the detachment promoter substance of the second layer 18 (e.g. of the second layer).

According to an embodiment, step vii) is followed by at least one step of scrap elimination 60 wherein, externally to the suspension handle 2 and/or to the secondary label 34, the second front layer 28 is picked up as a continuous scrap 62, to so as to create a lifting step 64 around said suspension handle 2 and/or said secondary label 34.

The above objects are also achieved by a label 1 with a suspension handle 2 as described hereinafter.

Since embodiments of said label are obtained by the above-described manufacturing method, even if not expressly stated, the label may comprise any feature deducible—from a process point of view—from the above description.

The label 1 comprises:

a first layered material 4 comprising a support layer 6 and a first front layer 8 joined in a releasable manner;

at least one detachment promoter layer 12, 18 coating a front surface 10 of the first front layer 8 leaving a free zone 14 wherein such a promoter layer 12, 18 is absent;

an optional second detachment promoter layer 18 coating in register a handle area 16 of the first detachment promoter layer 12;

a second layered material 20 comprising a second transparent front layer 28 and an adhesive layer 26', such second material 20 being joined to the first layered material 4 so that the adhesive layer 26' adheres at least to the free zone 14;

wherein at least the thickness S1 of the second front layer 28 delimits a suspension handle 2 at a handle area 16, a secondary label 34 in a different area 36, and the first front layer 8 forms a label surround 38.

Optionally the second detachment promoter layer 18 is solidified in contact with the adhesive layer 26', so as to bind such layers 18, 26'.

According to one embodiment, the suspension handle 2 comprises at least one grip portion 30 where the handle area 16 also extends at such portion 30.

According to a further embodiment, the second front layer 28 delimits at least one creasing line 42, 44, so as to facilitate a lifting of a portion, for example a peripheral portion, of the secondary label 34 and/or the suspension handle 2.

According to a still further embodiment, in the free zone 14, the second front layer 28 comprises a single anchoring foot 46 of the suspension handle 2, from which a pair of arms 48, 48' extend, connected in the form of a ring to each other.

Optionally, the pair of arms 48, 48' is rotatable relative to the anchoring foot 46 (about an axis of rotation R advantageously common to both arms), to allow the handle to be taken outside of the label, and act as a suspension of a bottle associated therewith, in the overturned position.

According to one embodiment, the second front layer 28 is at least partially transparent to light to reveal an optional first graphic layer 56 distributed on the first front layer 8.

According to one embodiment, the second front layer 28 is made only partially opaque to the suspension handle 2 to reveal the presence thereof without concealing a first graphic layer 56 superposed on the first front layer 8.

According to one embodiment, at the secondary label 34, the label 1 comprises an opaque contrast layer 104, superposed on the second front layer 28 to eliminate the transparency thereof, at least one second graphic layer 58 superposed on the contrast layer 104 and at least one protective layer 106 of the at least one second graphic layer 58, at least partially transparent to light.

Optionally, a detachment promoter layer (e.g. the second layer 18) may comprise at least one pigment or color to make at least a part of the suspension handle 2 evident, without hiding the aforesaid first graphic layer 56.

Advantageously, externally to the suspension handle 2 and/or to the secondary label 34, the second front layer 28 is absent, so as to create a lifting step 64 around said handle and/or said secondary label 34.

According to one embodiment, the at least one protective layer 106 is applied at least on the at least one second graphic layer 58 using a flexographic method.

According to an embodiment, the at least one protective layer 106 is applied with a thickness equal to or greater than at least 1 μm.

According to an embodiment, the front surface 10 of the first front layer 8 is covered with a first 12 and a second 18 detachment promoter layer mutually superposed outside the secondary label 34. The manufacturing process illustrated in FIG. 1 will now be described, purely by way of example, wherein the manufacturing direction F1, F2 develops from left to right according to the orientation of the arrows.

A first layered material 4 and a precursor 22 of a second layered material 20 are fed by two separate feeding reels, indicated by reference numerals 66, 68.

According to an embodiment, the first layered material 4 and precursor 22 are identical materials or corresponding materials, fed by the two different reels 66, 68.

In the present description, the word "identical" means a material with the same layers described, although the different layers may in principle be chemically different between the first layered material and the precursor (and hence also between the first and second layered material).

Such a "common" layered material optionally consists of the following layers, superposed from bottom to top in the following order: a support layer 6, a de-adhesive layer 24 (e.g. silicone), an adhesive layer 26, 26' and first front layer 8 and/or a second 28 front layer, for example printable.

The aforesaid layers are superposed on each other completely, with substantially full surface or in a prevailing manner.

From the precursor 22 coming from the reel 68, the support layer and the de-adhesive layer are promptly removed, which are separated and rewound on a scrap reel 70, while the adhesive layer 26' and the second front layer 28 constitute the second layered material 20 that will continue towards a joining point 72 in the direction F1.

According to one embodiment, at the arrow 102 (i.e. after the aforesaid separation), on the second layered material 20 are distributed or printed, in the area where the secondary label 34 will be subsequently obtained, the contrast layer 104 superposed on the second front layer 28, the at least one second graphic layer 58 superposed on the contrast layer 104 and the at least one protective layer 106 of the at least one second graphic layer 58.

According to an embodiment, a first graphic layer 56 (e.g. containing product information) is distributed or printed on the first layered material 4 coming from the reel 66 and, above the first graphic layer 56, a single detachment promoter layer or a first 12 and a second 18 detachment promoter layers are superposed, such as silicone coating, to obtain the following intermediate material 74.

The first or only detachment promoter layer 12, in contact with the graphic layer 56, occupies a smaller surface area than the front surface 10 of the first front layer 8. More precisely, such layer 12 is applied so as to leave a free zone 14 wherein such promoter layer 12 is absent.

For example, the detachment promoter layer 12 may be applied in a recessed position relative to a first longitudinal edge 76 of the first layered material 4, so as to provide the second layered material 20—which will be superposed on the intermediate material 74 at the joining point 72—with a free surface to which an anchoring foot 46 of the suspension handle 2 formed by such a second layered material 20 may firmly adhere.

The optional second detachment promoter layer 18, superposed and optionally in contact with the first detachment promoter layer 12, will instead be applied in register with the predetermined position of the suspension handle, in liquid or semi-liquid form.

In the present description, the term "in register" means an application on a layer with a specific shape, in the present case substantially corresponding to the surface of the suspension handle.

In this regard, suitably shaped masks may be used, which cover the underlying layer 12 to prevent the deposit of the second detachment promoter layer 18 outside the profile of the handle 2.

With regard to the expression "semi-liquid" used above, it should be noted that, in this description, this term means any liquid substance able to flow, even with a low fluidity, in particular at the temperature of execution of step iii).

By way of non-limiting example, such term may mean any viscous, gelatinous and/or pasty substance.

According to an embodiment, the suspension handle 2 is made evident through partial opacification, pigmentation, or coloring of the second front layer 28, which creates a visual or chromatic separation from the first front layer.

Optionally, partial opacification, pigmentation, or coloring of the second front layer 28 may be achieved through the characteristics of a detachment promoter layer 18, which may specifically comprise a pigment or a color.

For example, such a pigment or color may be mixed with the detachment promoter substance of the second layer 18, or it may be disposed on the surface of the second detachment promoter layer 18 facing towards the second front layer 28.

The function of the optional second detachment promoter layer 18 is of course to neutralize or make almost completely inert the adhesion power of the adhesive layer 26' of the second layered material 20, through the transfer mechanism discussed above, in order to facilitate the lifting of (just) the handle.

The intermediate material 74 and the second layered material 20 are then joined in the joining point 72, being in particular joined and pressed by a couple of rolls 78, 80, thus obtaining the coupled material 40.

Downstream of the production of said coupled material 40, the optional second detachment promoter layer 18 is then solidified in contact with the adhesive layer 26', for example by UV radiation, so as to bind such layers 18, 26' and make the adhesive layer 26' "passive".

In a subsequent step, a first die cutting-creasing step 82 and a second die-cutting step 84 are carried out, each followed by an elimination of production scrap 62, 86.

During the first die cutting-creasing step 82, a tool may optionally be used configured for folding or creasing, without cutting, the second front layer 28 at the suspension handle 2 (in particular at the grip portion 30 thereof, when provided) and/or the lifting portion 54 of a secondary label 34.

As regards the position of the secondary label 34, the latter will be positioned just above the first detachment promoter layer 12, because the adhesive power of such a label 34 must not be totally eliminated (or rather must not be made inert) as in the case of the suspension handle.

In this way, through the transfer and solidification of the second detachment promoter layer in (semi-)liquid form, it will be possible to make the adhesive layer 26' inert to the suspension handle 2 without affecting the adhesion power of the secondary label 34.

In all the other portions, other than the aforesaid creasing lines 42, 44, the so-called cutting depth 82 of the coupled material 40, will extend until at least the second front layer 28 is cut, and optionally also the second detachment promoter layer 18, possibly without affecting the layer 12 thereunder.

Figure 12:
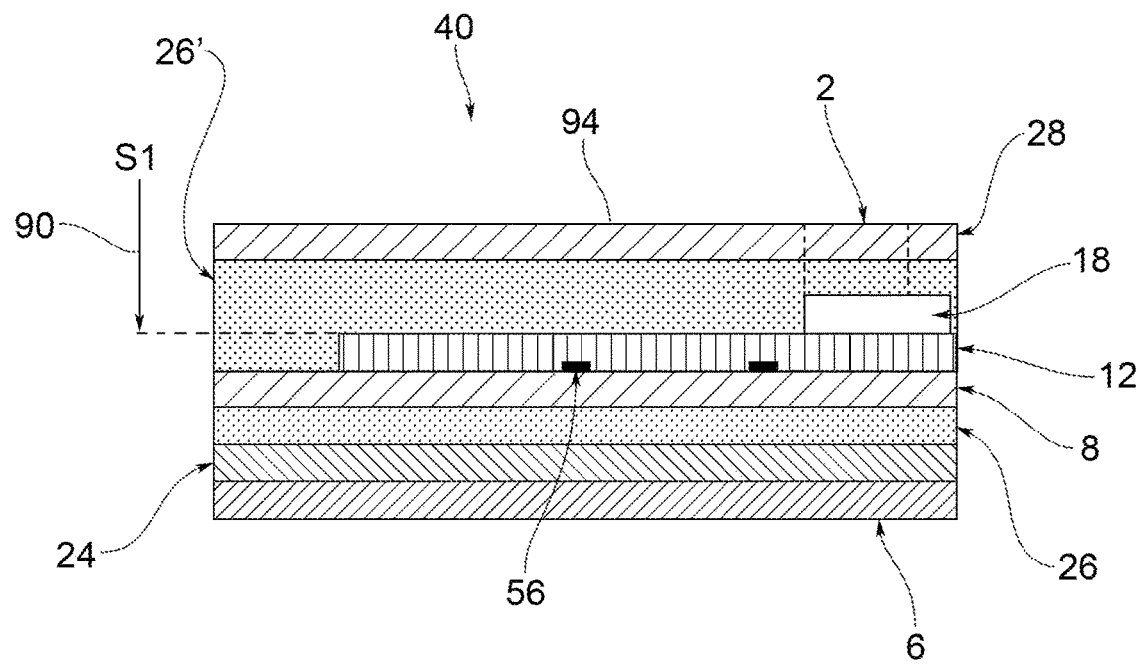
FIGS. 12, 13 show sections respectively through planes XII-XII, XIII-XIII shown in FIG. 11, wherein the arrows show separation, cutting, or die depths through the illustrated materials.
Figure 13:
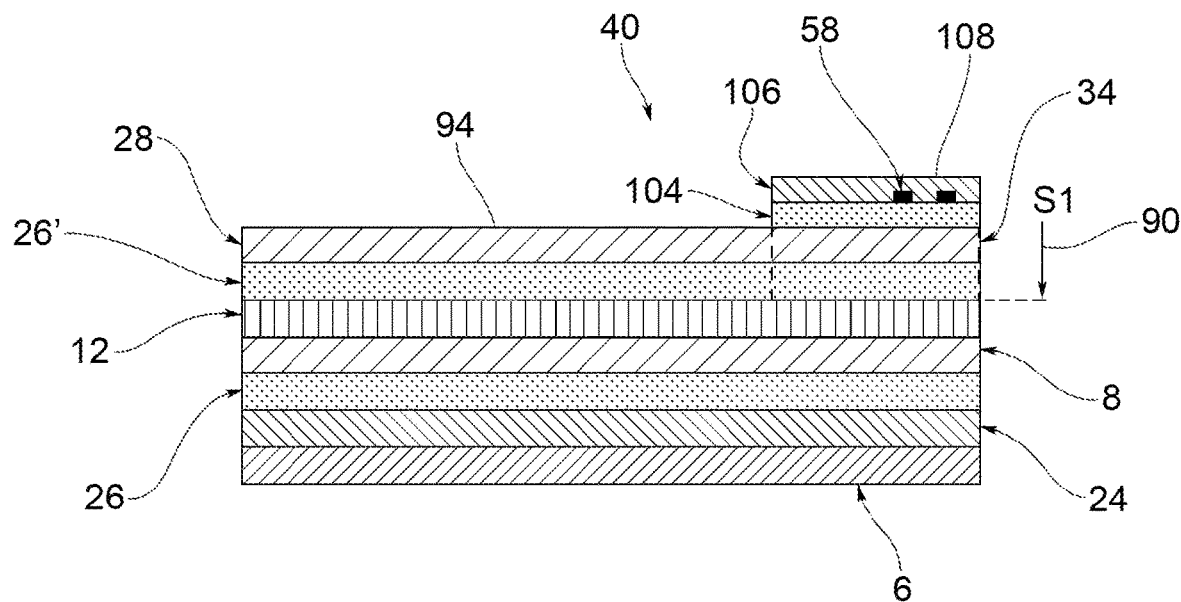

The cutting depth of the coupled material 40 in this first step 82 is indicated by the arrows 90 in FIGS. 12, 13.

Figure 14:
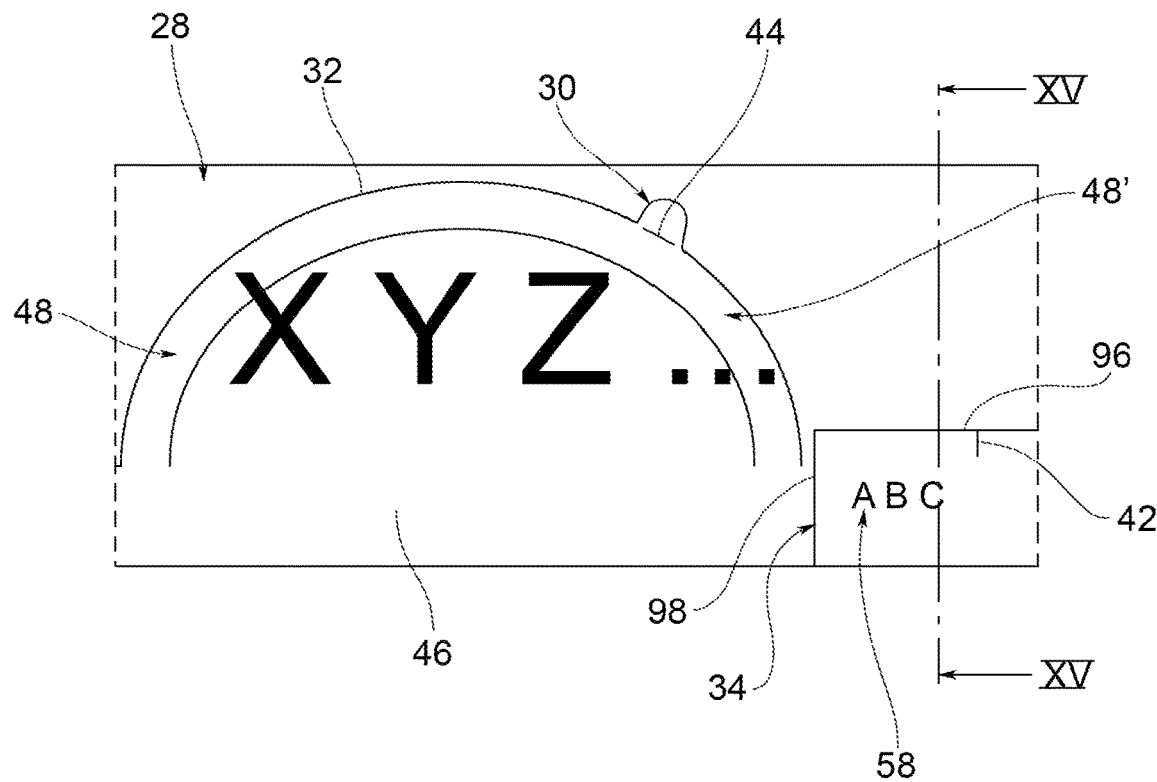

The profile of the die of the first die-cutting-creasing step 82 is such as to create—both internally and externally—the shape of the handle and to partly cut out the second front layer 28 (for example: along a pair of sides 96, 98 optionally orthogonal; FIG. 14) around the perimeter of the secondary label 34.

Figure 17:
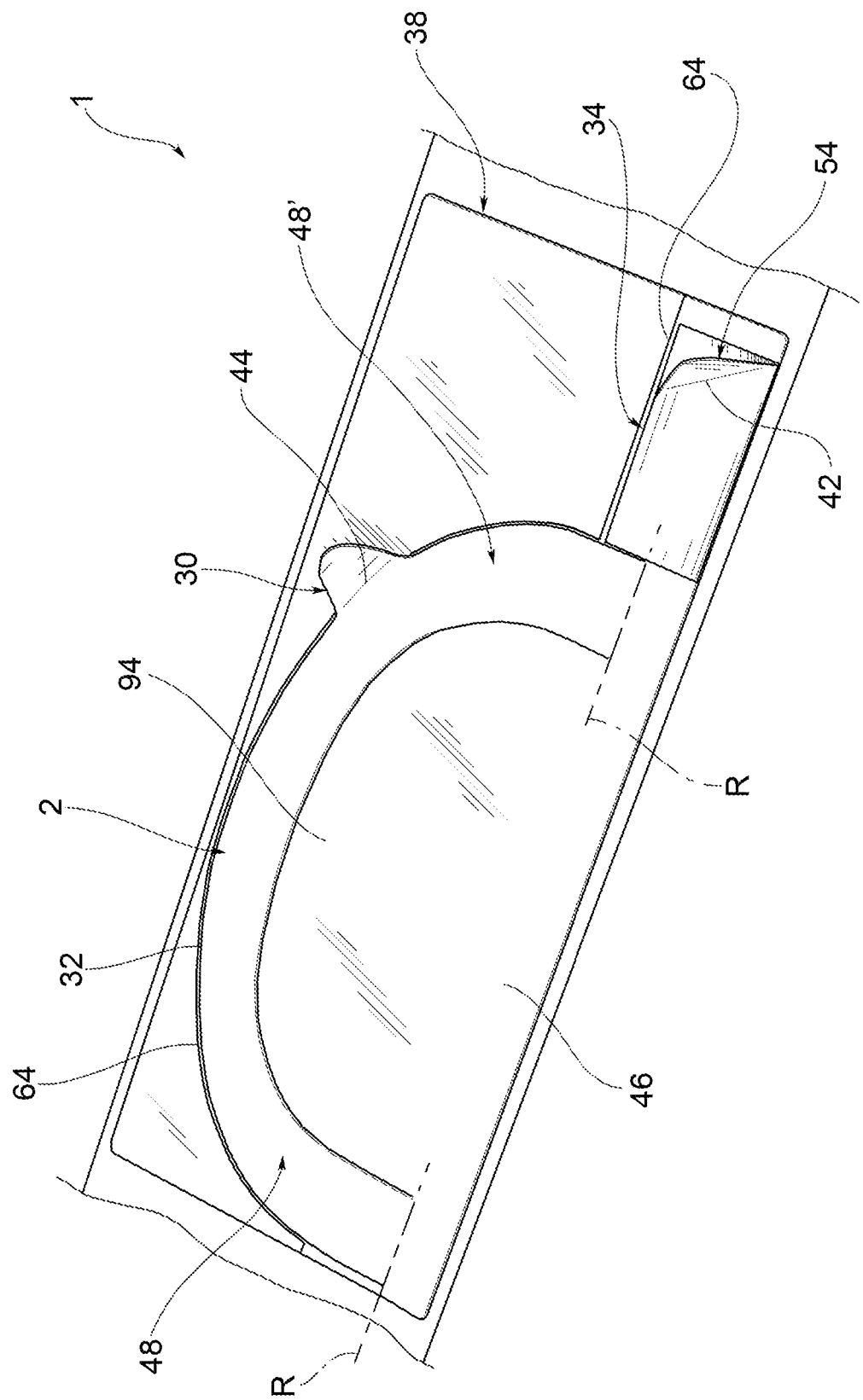
FIG. 17 shows a lifting step.

The portion removed as continuous scrap 62 downstream of the first die-cutting-creasing step 82 is therefore a strip having a shape complementary to the lifting step 64 illustrated in FIG. 17.

Figure 15:
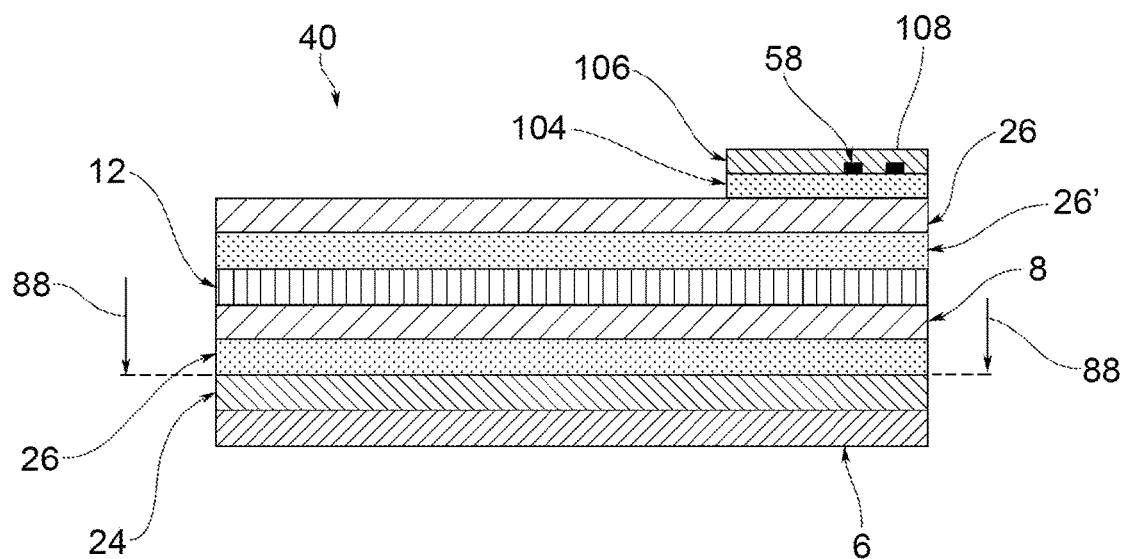
FIG. 15 shows a section through the plane XV-XV shown in FIG. 14.
Figure 16:
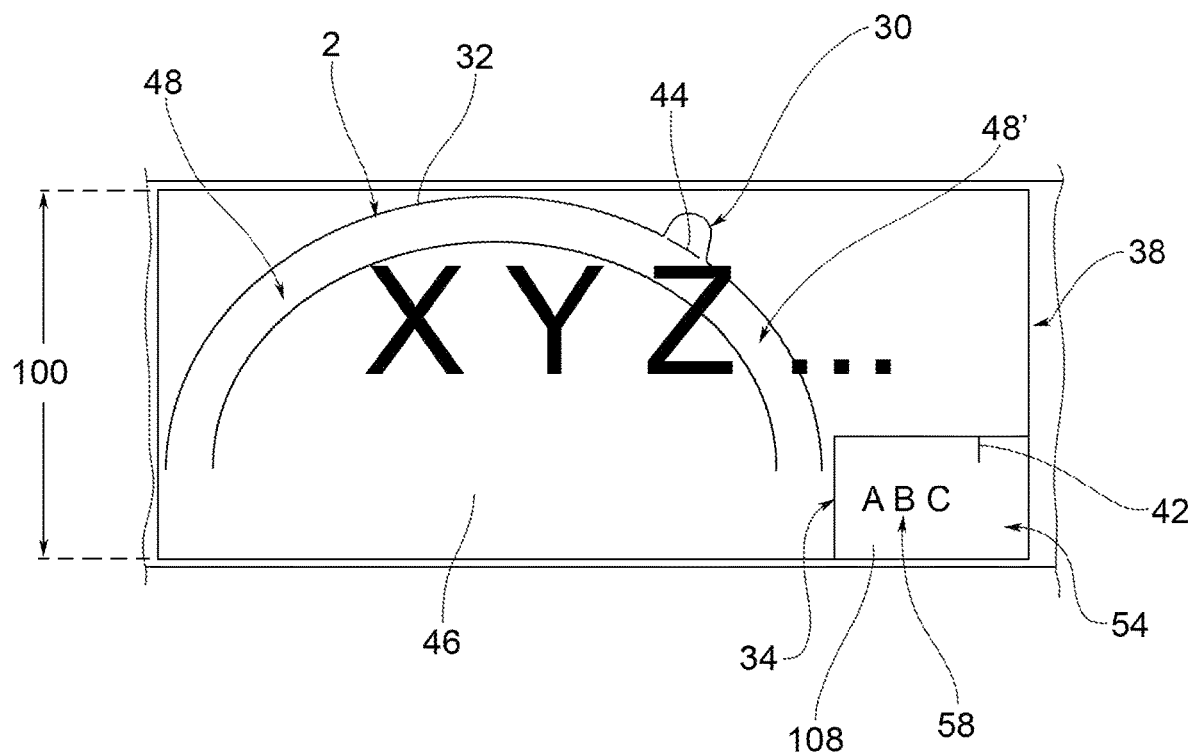

During the second die-cutting step 84, a sharp tool is used, configured to cut into the coupled material 40 from the surface 94 thereof at least up to the first front layer 8, and optionally up to the adhesive layer 26 of the original intermediate material 74, as shown by the arrows 88 illustrated in FIG. 15.

In any case, within the exposed surface of label 1, this second die-cutting step 84 will cut the label surround 38 around the first front layer 8 and around the suspension handle 2.

FIG. 13 shows the position of the secondary label 34 relative to the first (or only) detachment promoter layer 12.

For said secondary label 34, the only or first detachment promoter layer 12 may optionally be specially modulated, by depositing the promoter only in some areas, preventing a layer inert to the adhesive substance of said layer from forming underneath the adhesive layer of the secondary label.

Figure 5:
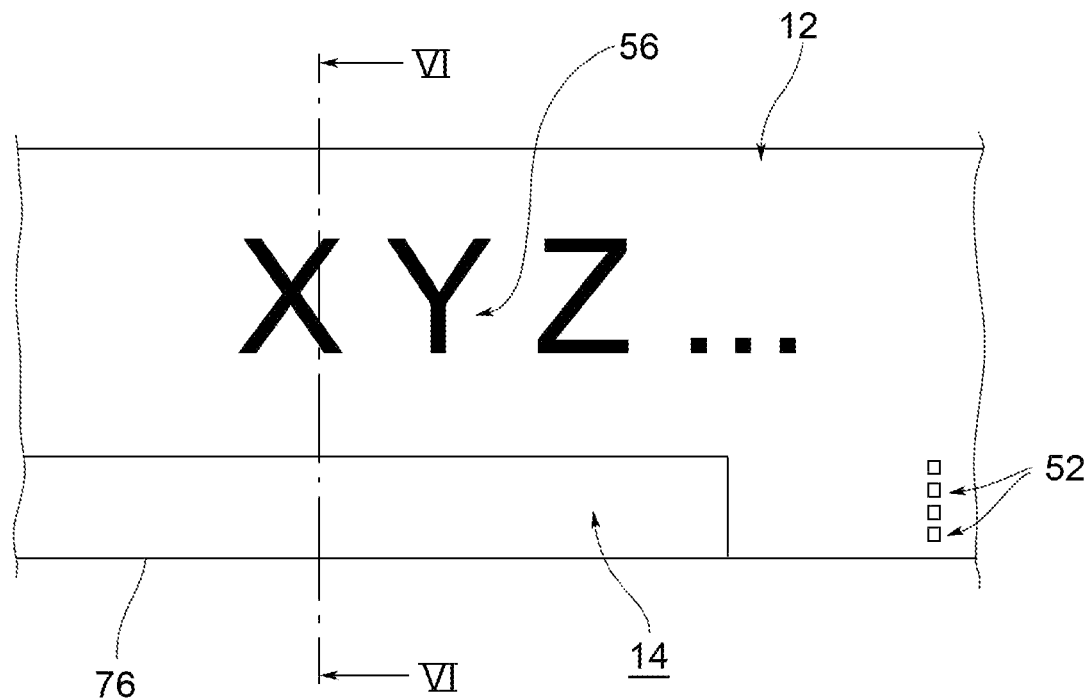
Figure 6:
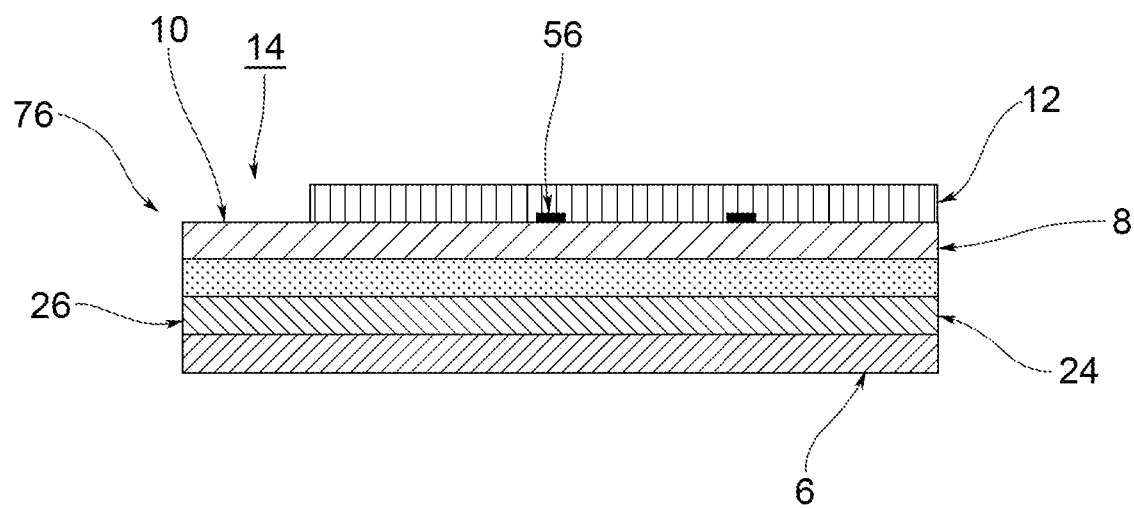
FIG. 6 shows a section through plane VI-VI shown in FIG. 5.
Figure 7:
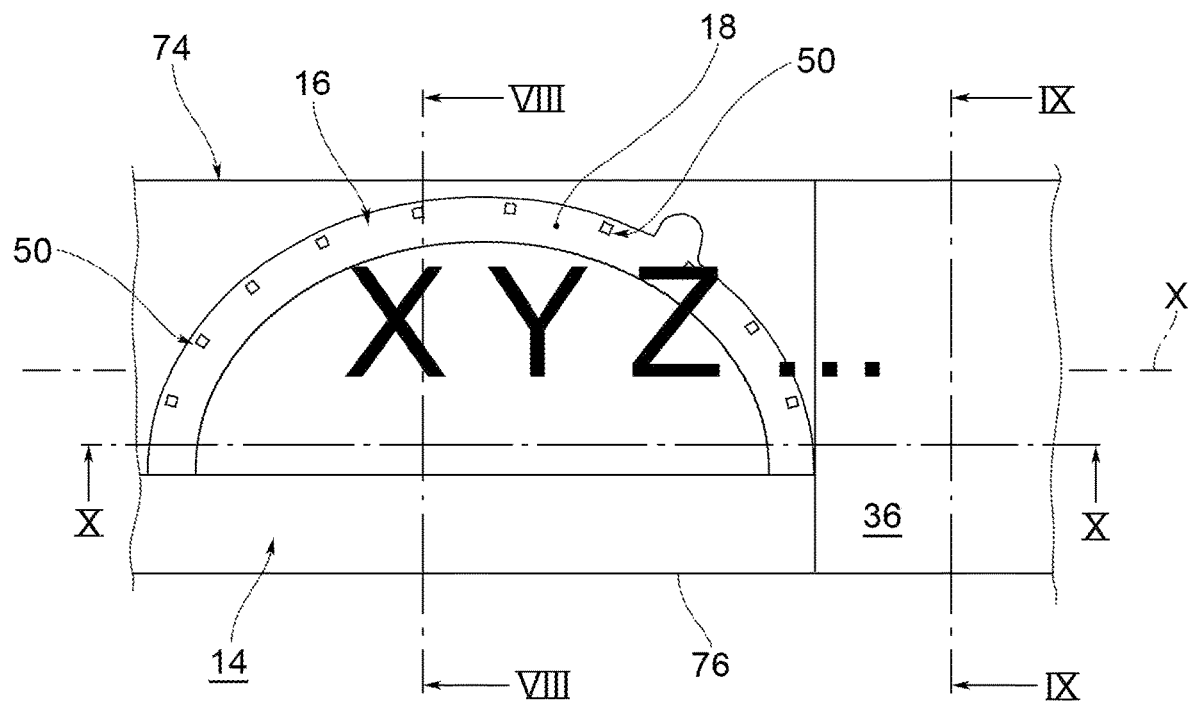
Figure 8:
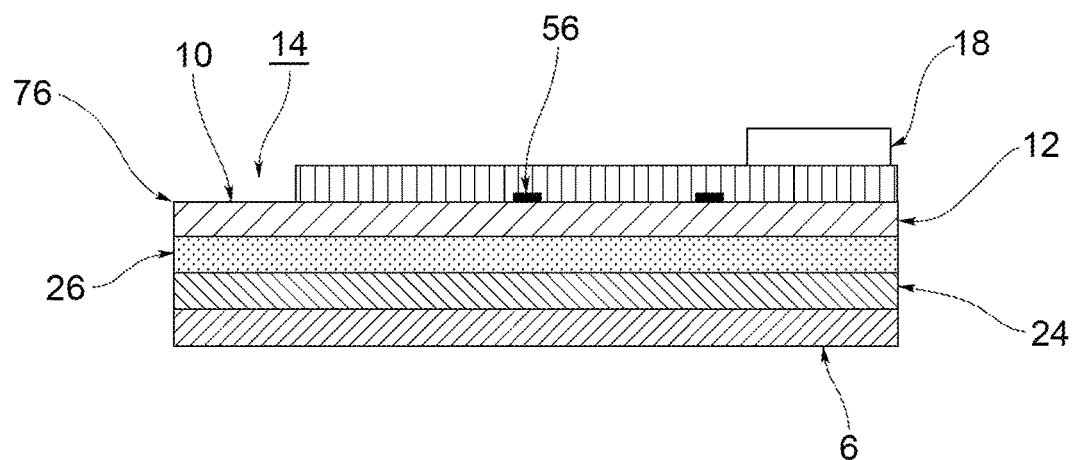
FIGS. 8, 9, 10 show sections through the planes VIII-VIII, IX-IX, X-X, respectively, shown in FIG. 7.
Figure 9:
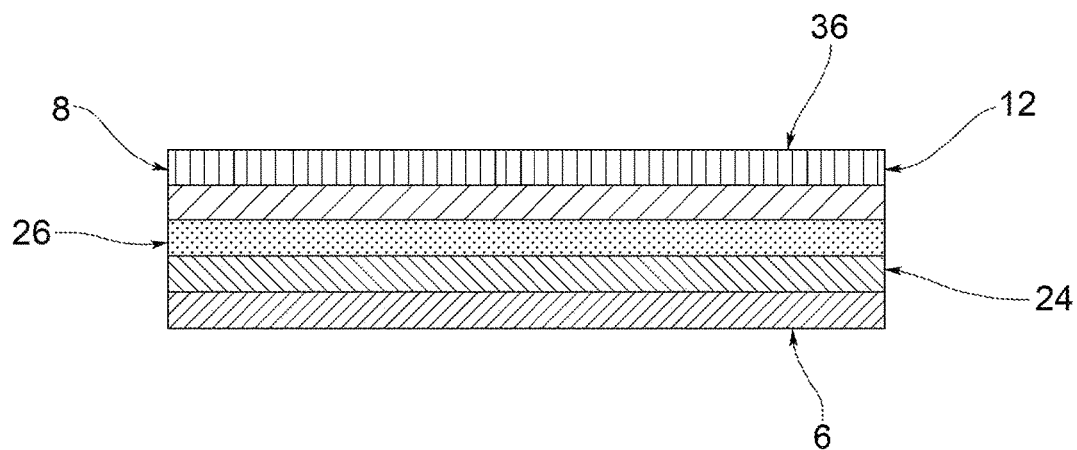
Figure 10:
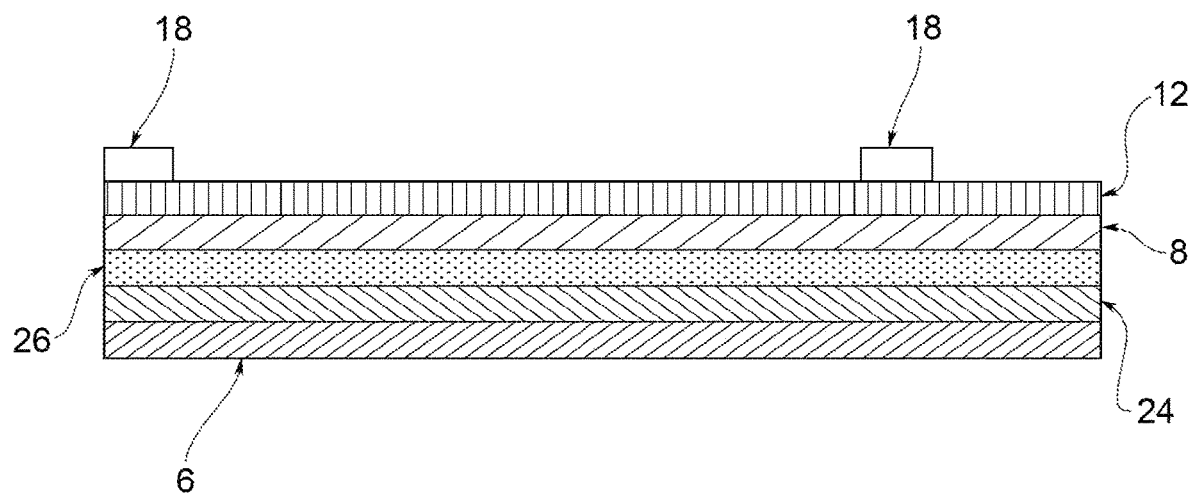
Figure 11:
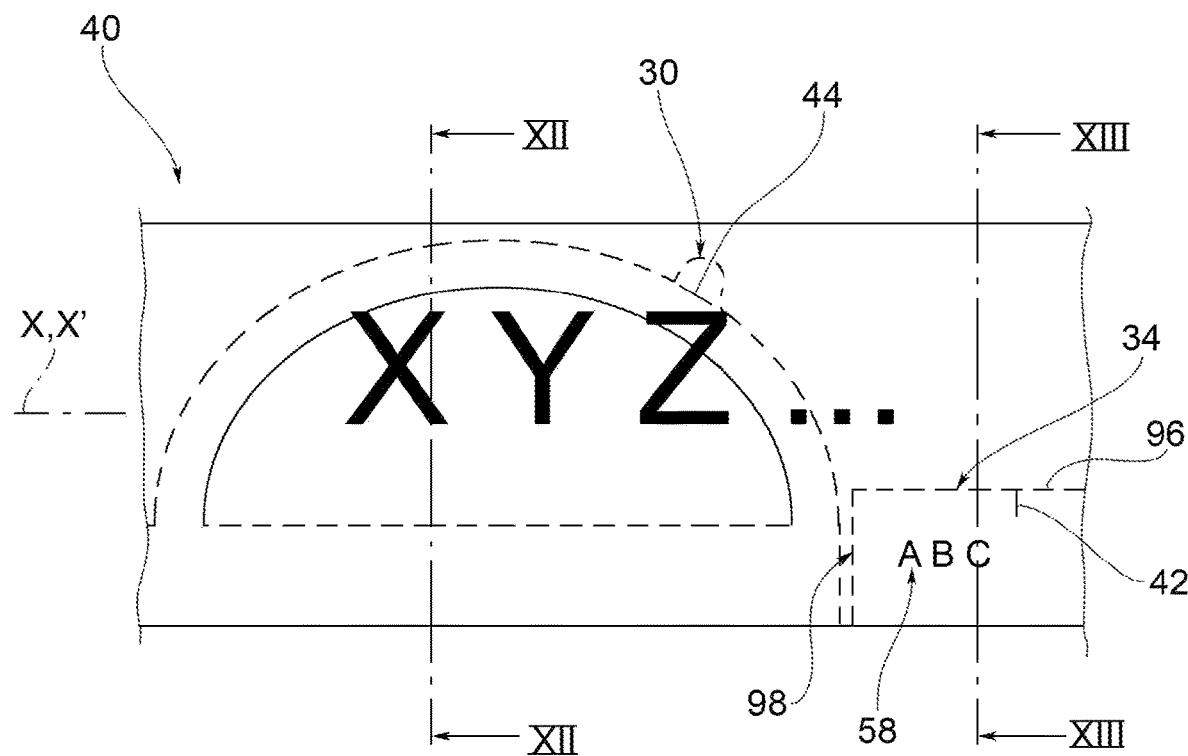

In this regard, protection masks may be used which prevent the coating of some areas 52 (FIG. 5) of the first front layer 8. A similar device may be used to prevent the coating of some areas 50 below the second front layer with the second detachment promoter layer 18, in order to obtain a non-sticky handle, dry to the touch.

Conversely, FIG. 12 shows the optional double detachment promoter layer 12, 18 below the suspension handle 2 in the portions outside the anchoring foot 46.

The second die-cutting step 84 therefore has the function of creating the separation between adjacent labels 1, and the continuous scrap 86 will be shaped as a strip in which empty seats are formed (rectangular seats according to the embodiments shown), having a shape complementary to the label surround 38 of each label, interspersed with partitions corresponding to the material removed to divide the labels 1.

Downstream of the elimination of the second continuous scrap 86, the labels 1 have been formed and may be wrapped into a reel 92 (FIG. 1).

Innovatively, the method and the label object of the present invention allow the drawbacks related to the prior art to be fully overcome.

More precisely, the proposed method and handle allow transparencies and opacities of the second front layer to be modulated, so as not to conceal the first graphic layer, to show the position of the suspension handle, to suppress the transparency of such layer to the secondary label to create a contrast for the second graphic layer and to protect the latter.

Advantageously, the proposed method and label allow a label with a handle to be obtained in a single production step, without having to perform special operations (such as gluing the handles one by one), in a simple, reliable and economical way.

Advantageously, the proposed method and label allow to obtain a secondary writable label, thus allowing it to be annotated with writing according to contingencies.

Advantageously, the method and the label object of the present invention provide an innovative liquid or semi-liquid coating system and a subsequent solidification or curing aimed to create a passive layer for transfer below the handle.

Moreover, the handle may be handled easily due to dry contact.

Advantageously, the method and the label object of the present invention provide a significant productive economy, not only by virtue of the raw materials involved in manufacture.

Advantageously, the method and the label object of the present invention allow a good grip on the handle and/or on the secondary label.

Advantageously, the method and the label object of the present invention provide an extremely cost-effective system to identify the handle without covering the underlying graphics.

Advantageously, the method and the label object of the present invention allow specific ergonomic portions to be created to ensure easy interaction with the user.

Advantageously, the risk of breaking the handle or an arm thereof from the foot is virtually absent under normal operating conditions.

Advantageously, the method and the label object of the present invention provide an additional system to regulate the adhesive power of the lifting portions from the label surface.

Advantageously, the method and the label object of the present invention allow labels to be obtained that may be applied as a continuous strip, so as to simplify the application on bottles in automated processes.

Advantageously, the method object of the present invention is cost-effective, and the label described may be produced at low cost.

A person skilled in the art may make several changes or replacements of elements with other functionally equivalent ones to the embodiments of the above method and label in order to meet specific needs.

Also, such embodiments are included within the scope of protection as described and claimed herein.

Moreover, each embodiment described as belonging to a possible embodiment may be implemented independently of the other embodiments described.

What is claimed is:

1. A method for manufacturing a label with a suspension handle, the method comprising steps of:
   i) providing a first layered material comprising a support layer and a first front layer joined in a releasable manner;
   ii) coating a front surface of the first front layer with at least one detachment promoter layer, leaving a free zone on the first layered material wherein the at least one detachment promoter layer is absent;
   iii) providing a second layered material comprising a second front layer transparent to light and an adhesive layer;
   iv) joining products of steps ii) and iii) into a coupled material so that the adhesive layer adheres at least to the free zone on the first layered material; and
   v) at least in the thickness of the second front layer, separating a suspension handle from a handle area, at least one secondary label of the label in a different area, and forming a label surround in the first front layer;
   wherein the second front layer is made only partially opaque to the suspension handle to reveal presence of the suspension handle without hiding a first graphic layer superposed on the first front layer, and
   wherein, at the at least one secondary label, the label comprises an opaque contrast layer superposed on the second front layer to eliminate its transparency, at least one second graphic layer superposed on the opaque contrast layer, and at least one protective layer of the at least one second graphic layer, at least partially light-transparent.

2. The method of claim 1, wherein the at least one protective layer is applied on the at least one second graphic layer by a flexographic method, with a thickness equal to or greater than at least 1 µm.

3. The method of claim 1, wherein the at least one protective layer delimits a surface writable by an ink writing instrument, including a ballpoint pen.

4. The method of claim 1, wherein the at least one protective layer delimits a surface writable by line markers, including thermal transfer markers.

5. The method of claim 1, wherein the second front layer is made opaque through a pigment or a color mixed with a detachment promoter substance of the at least one detachment promoter layer.

6. The method of claim 1, wherein:
   the first layered material and a precursor of the second layered material comprise corresponding or substantially identical layers comprising, superposed on each other, the support layer, a de-adhesive layer, the adhesive layer, and the first front layer and/or the second front layer,
   step iii) further comprises a step of separating and optionally discarding the support layer and the de-adhesive layer of the precursor upstream of step iv), and
   step v) is carried out outside the free zone so that in the free zone, the second front layer comprises a single anchoring foot of the suspension handle, from which a pair of arms extend, connected in a form of a ring to each other.

7. The method of claim 1, wherein step ii) comprises a step of coating the front surface of the first front layer with first and second detachment promoter layers reciprocally superposed outside the at least one secondary label.

8. A label with a suspension handle obtained using the method of claim 1, the label comprising:
- a first layered material comprising a support layer and a first front layer joined in a releasable manner;
- at least one detachment promoter layer covering a front surface of the first front layer, leaving a free zone wherein the at least one detachment promoter layer is absent;
- a second layered material comprising a second front layer transparent to light and an adhesive layer, the second layered material being joined to the first layered material so that the adhesive layer adheres at least to the free zone;
- wherein at least a thickness of the second front layer delimits a suspension handle at a handle area, a secondary label in a different area, and wherein the first front layer forms a label surround;
- wherein the second front layer is only partially opaque to the suspension handle to reveal presence of the suspension handle without hiding a first graphic layer superposed on the first front layer, and
- wherein, at the secondary label, the label comprises an opaque contrast layer superposed on the second front layer to eliminate its transparency, at least one second graphic layer superposed on the opaque contrast layer, and at least one protective layer of the at least one second graphic layer, at least partially light-transparent.

9. The label of claim 8, wherein the at least one protective layer is applied on the at least one second graphic layer with a flexographic method, with a thickness equal to or greater than at least 1 μm.

10. The label of claim 8, wherein the at least one protective layer delimits a surface writeable by an ink-writing tool, including a ballpoint pen.

11. The label of claim 8, wherein the at least one protective layer delimits a surface writeable by line markers, including thermal transfer markers.

12. The label of claim 8, wherein the second front layer is made opaque through a pigment or a color mixed with a detachment promoter substance of the at least one detachment promoter layer.

13. The label of claim 8, wherein in the free zone, the second front layer comprises a single anchoring foot of the suspension handle, from which a pair of arms extend, connected in a form of a ring to each other.

14. The label of claim 8, wherein the front surface of the first front layer is coated with first and second detachment promoter layers reciprocally superposed outside the secondary label.

* * * * *